Feb. 28, 1933.  G. WICKBERGH  1,899,489
SCREW DRIVER
Filed Oct. 2, 1931
Fig.1.  Fig.3.  Fig.4.  Fig.7.
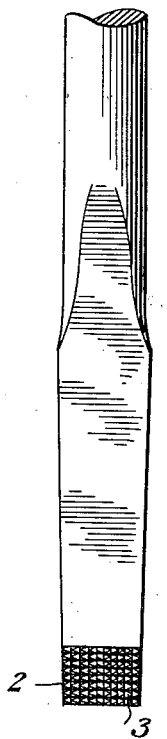
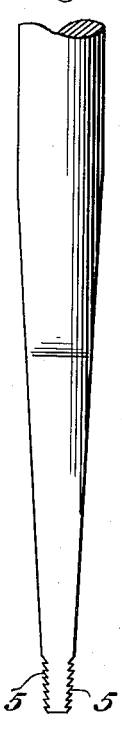
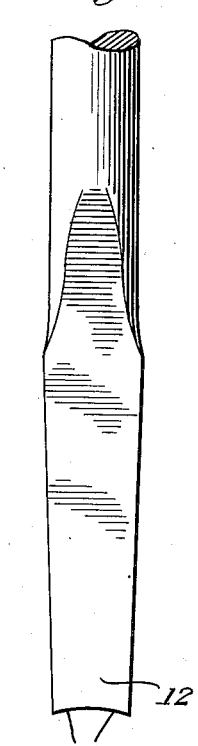
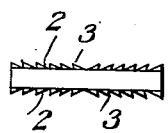
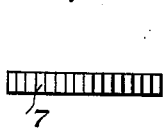
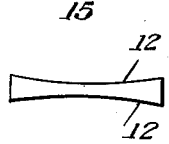
Fig.2.  Fig.5.  Fig.8.
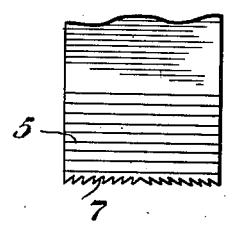
Fig.6.
Godfrey Wickbergh
INVENTOR
BY Victor J. Evans & Co.
ATTORNEYS Patented Feb. 28, 1933

1,899,489

UNITED STATES PATENT OFFICE

GODFREY WICKBERGH, OF SEATTLE, WASHINGTON

SCREW DRIVER

Application filed October 2, 1931. Serial No. 566,527.

One of the objectionable features with the present-day screw drivers is that they will often jump out of the slot of the screw head, and thereby plunging into the wood or metal work that is being done, spoiling, or disfiguring same, also when the screw driver thus slips away the man operating same is often hurt. This condition is particularly objectionable when one is engaged in putting in screws into finely-finished work of any nature, which is then often spoiled. The screws also are often spoiled when the driver is forced out of the slot, as it leaves the screw heads ragged at the points where the screw driver jumps over the edges of the slot in the screw head.

In order to understand and appreciate the improvements embodied in my improved screw driver points, it is necessary to first analyze the action of a screw driver when force is supplied to same in screwing in a screw very tight.

As is well known, the blade of a screw driver is pointed, that is, tapered toward one end, and therefore is wedge shaped. When force is applied on the screw driver as when used in driving a screw firmly home, on account of the wedge-shaped point of the screw driver, and when a strong twisting action is imparted to same, the driver, on account of its taper, will actually lift itself out of the slot in the screw head, and of course when it is once out of the slot the screw driver will then slip away from the screw head in any direction depending on the angle at which the driver is operated in relation to the screw, and the damaging action thus results. This is the main reason why a screw driver will jump out of the slot in the screw head, and that this action actually takes place can be easily analyzed, and it is proven by the simple fact that the edges of the slot in the screw head are always spoiled, or disfigured, and in fact the metal is partly broken away by the corners of the screw drivers at the points where by the twisting action it gradually lifts itself out of the slot and finally jumps out of the slot altogether.

A second cause whereby a screw driver will also jump out of the slot is where a sidewise motion takes place when the screw driver is held at an angle in relation to the screw head. Under this condition the screw driver will merely slide out of the slot depending on the angle at which it is held and a sidewise motion takes place and depending on the angle at which the screw driver is held in relation to the screw. Under this last named condition, no damage is done to the screw head, as the driver merely slides out of the slot, leaving it undamaged, but damage may nevertheless result if the screw driver plunges into the work that is being done. This last condition can nearly always be avoided by holding the screw driver in a straight line with the screw except when the screw may be in an inaccessible place.

In the accompanying drawing:

Figure 1 is a side elevational view of one form of the screw driver.

Figure 2 is an end view thereof.

Figure 3 is a side elevational view of another form of the screw driver.

Figure 4 is an edge view thereof.

Figure 5 is an end view thereof.

Figure 6 is an enlarged side view thereof.

Figure 7 is a side elevational view of still another form of the screw driver.

Figure 8 is an end view thereof.

Figure 1 shows one form of my invention. The screw driver blade is provided near its end, and on both sides, with angular depressions 2, preferably running both lengthwise and transversely of the blade thus crossing each other in any angular relation that may be most effective. These small angular depressions crossing each other will thus provide a large number of small angularly pointed knurls 3 substantially the same as the surface of a fine file as shown. An end view of Figure 1 is shown at Figure 2 and shows how the angular points are related to most effectively stop any transverse motion of the screw driver. The small points substantially in the form of acute angles are pointed from the center towards the sides of the driver blade as shown and on account of their form and inclination will stop any sidewise motion of the screw driver. In action these angular points will grip the contacting sides of the slot in the screw head and effectively stop any slipping motion of the screw driver. As more force may be applied the more securely will these points engage the contacting metal of the screw head. The arresting force of these points, to check any motion in any direction is proportional to the area of the metal that is being contacted in the screw head and the force that is being applied to the screw driver. This result is governed by the functions of angles.

Figure 3 shows another embodiment of the same principle in which these angular depressions are running transversely of the blade only as shown at 5. The end of the screw driver is similarly furnished with angular recesses and points and inclined in the manner shown at 7. It will be noted that the points and angles are inclined from the center of the blade outwards towards the corners, or sides, of the driver blade. In practice these angular points will engage the bottom of the screw head slot and when pressure is applied these points will augment the arresting force of the angular surfaces of the sides of the screw driver blade. The functions of angles governs this result, the arresting force is proportional to the force applied and the area contacted by these angular points.

When twisting force is applied to the screw driver the points 5 will engage the contacting metal of the screw head and effectively stop any longitudinal motion of the driver.

The action of the teeth 5 is to stop this lifting out action, which is the main reason why a screw driver jumps out, and that the action of the teeth 7 contacting the bottom of the screw head slot is to stop any side motion of the screw driver that might enable the screw driver to slide out sideways. The combination of these teeth like points on the sides and end of the screw driver makes this screw driver efficient and it will stop any jumping out action of the screw driver.

In practice the grooves or recesses might preferably increase in depth approximately proportionally as to the taper of the screw driver blade. Thus even if the point of the screw driver should be broken off, as is apt to happen, the point of the driver could then be reshaped and the teeth-like recesses could still be there, although the points might not be quite as sharp as when the tool was new, but it would still be efficient. Also these recesses would preferably decrease in depth towards the corners of the screw driver; this would make these corners stronger than the middle section of the screw driver which is preferable since the greatest strain is on these corners when a twisting action is imparted to the driver.

The screw driver shown in Figure 7 is brought out where a simple and cheap screw driver might be preferred. The sides of this screw driver and also the point are made slightly concave, or hollow, as shown at 12. This concavity will be very slight and just enough to offset the wear on the corners of the driver and thus place the strain near the corners of the driver, and if the concavity is just great enough to free the center section of the driver from contact with the screw head sides it will be seen that the corners only will contact the metal of the screw head and will provide a simple driver that does not easily jump away from the screw.

The screw drivers shown in Figures 1 and 3 may also be made very slightly concave. Their effectiveness would be still further increased, but the concavity should only be great enough to liberate the middle section of the driver blade from immediate contact with the metal of the screw head. This arrangement would concentrate the force towards the points 15 of the screw driver blade and thus make the arresting force still more effective, and since these sections of the blade would also be stronger, when the blade is slightly concave, it would be well equal to the strain. This arrangement will provide a sort of a springing action to the screw driver blade which is very beneficial. When the position of the hand is changed in turning the screw driver handle, the force on the screw driver is then relaxed and it is at such times that the jumping out action is most likely to occur. But with this concave blade and its resultant tension more nearly like the action of a spring, if the force on the screw driver handle is momentarily relaxed this spring tension would only be lessened, but the screw driver would still be in effective contact with the metal of the screw head and thus prevent any undue motion of the screw driver as long as any force at all is applied to same.

The taper of the screw driver blade is very slight and this will minimize the lifting out action of the screw driver, it will make the blade more springy, it would obviate the necessity of having the grooves deeper as the taper increases. If the screw driver point be broken off, the taper has to be ground off to bring the blade down to proper thickness.

The knurls 3 have sides tapering to slender points whereby the said knurls are in the form of acuminate teeth which bite the surfaces of the groove of a screw head and prevent relative movement of the screw driver bit with relation to the head of the screw.

Having described the invention what is claimed is:—

1. A screw driver comprising a blade provided with knurled working surfaces adapted to enter the walls of the slot of a screw head and having the points of the knurled working surfaces disposed in opposite directions from the median line of the blade.

2. A screw driver comprising a blade provided with knurled working surfaces adapted to enter the walls of the slot of a screw head and having the points of the knurled working surfaces disposed away from the median line of the blade.

3. A screw driver blade having on its working faces acuminately pointed teeth adapted to bite the walls of the groove of a screw head, the points on the opposite sides of the median line of the blade being disposed in opposite directions, and all of the teeth having their pointed ends extending away from said median line.

4. A screw driver blade having on its working face pointed teeth adapted to bite the wall of the groove of a screw head, the points on the opposite sides of the median line of the blade being disposed in opposite directions, and all of the teeth having their pointed ends extending away from said median line.

In testimony whereof I affix my signature.

GODFREY WICKBERGH.